(No Model.)
A. W. OHMAN.
FRUIT PICKER.
No. 497,202. Patented May 9, 1893.
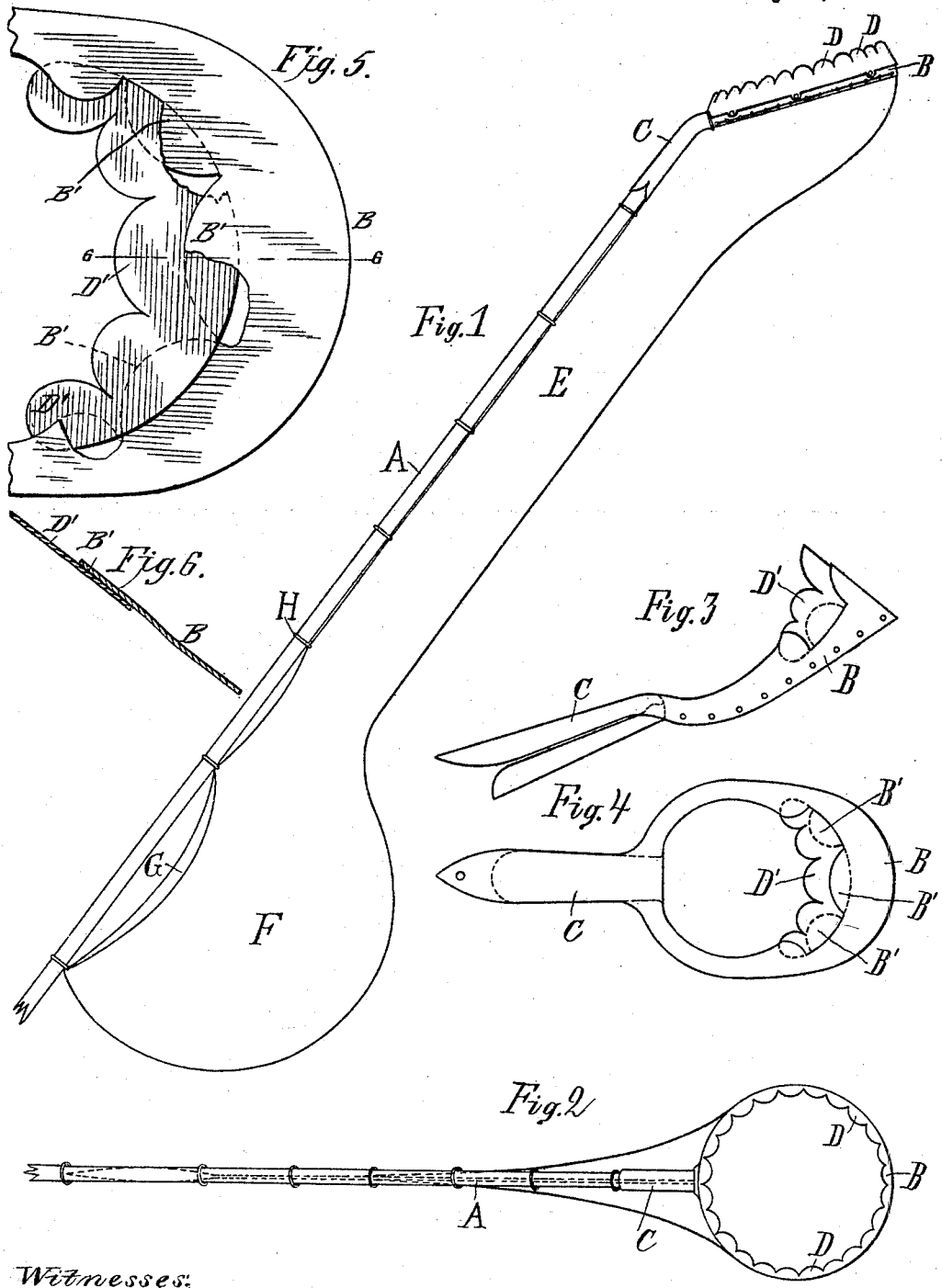
Witnesses:
E. M. Clark
C. Sedgwick
Inventor
A. W. Ohman
by Munn & Co
Attorneys.

UNITED STATES PATENT OFFICE.

ANDERS WILHELM OHMAN, OF TUNSTA, INSJON, SWEDEN.

FRUIT-PICKER.

SPECIFICATION forming part of Letters Patent No. 497,202, dated May 9, 1893.

Application filed November 20, 1891. Serial No. 412,525. (No model.)

*To all whom it may concern:*

Be it known that I, ANDERS WILHELM OHMAN, of Tunsta, Insjon, Sweden, have invented a new and Improved Fruit-Picker, of which the following is a full, clear, and exact description.

My invention relates to that class of fruit pickers which are adapted for use in gathering fruit from trees, and the object of my invention is to produce a simple apparatus by means of which fruit of various kinds may be conveniently picked and by means of which also the fruit may be conducted without injury, to a collecting bag carried by the operator.

To this end my invention consists in a fruit picker, the construction of which will be hereinafter described and claimed.

Reference is to be had to the accompanying drawings forming a part of this specification, in which similar letters of reference indicate corresponding parts in all the figures.

Figure 1 is a side elevation of the fruit picker embodying my invention. Fig. 2 is a plan view of the same. Fig. 3 is a side elevation of the preferred form of picking ring and knives. Fig. 4 is a plan view of the same. Fig. 5 is an enlarged detail plan view with parts broken away and Fig. 6 is a section on line 6—6 of Fig. 5.

The picker is provided with a long rod or handle A which, at its upper end carries a ring B preferably made of plate metal and the ring has on one side, a socket C adapted to fit upon the upper end of the handle or rod A.

On the upper edge of the ring B are formed teeth or knives D which have rounded edges and which project inwardly and upwardly from the ring, the said knives having their side edges sharpened so that when brought in contact with the stem of any fruit, they will sever the stem.

A flexible chute E is secured to the under side of the ring B so that any fruit cut by the knives D will drop into the chute, and the chute is supported upon the handle A by means of rings H. The chute E terminates at its lower end in a collecting bag F into which the fruit drops, and this bag has on the side nearest the handle, an opening G through which easy access may be had to the bag.

As before remarked, the chute E is of flexible material, and this will prevent the fruit from being bruised as each fruit as it drops through the chute will be compelled to force open the chute, which will be closed in front of it and the consequent resistance will retard the motion of the fruit so that it will drop without injury.

To operate the picker, the ring B is made to surround the fruit and then by a movement of the handle A, the knives or teeth D are brought against the stem of the fruit thus cutting off the stem and permitting the fruit to drop.

In order to provide for the removal of the knives, so that they can be readily sharpened, I construct and attach them to the carrier ring B as shown in Figs. 3, 4, 5 and 6. In these figures the carrier ring B is provided with projections B' on its upper edge and the knives or teeth D' are formed on a plate, which interlocks with the projections B' of the ring B and is secured thereto, as shown most clearly in Fig. 5.

Having thus fully described my invention, I claim as new and desire to secure by Letters Patent—

In a fruit picker, the combination with a ring having projections on its upper edge, of a plate provided with teeth and secured to the said ring, the said plate interlocking with the projections of the ring, substantially as described.

In witness whereof I have hereunto signed my name in the presence of two subscribing witnesses.

ANDERS WILHELM OHMAN.

Witnesses:
P. HEDBERG,
J. HULANDERS.